March 3, 1959
H. C. WIESE ET AL
2,876,331
WELDING APPARATUS
Filed March 29, 1957
2 Sheets-Sheet 1
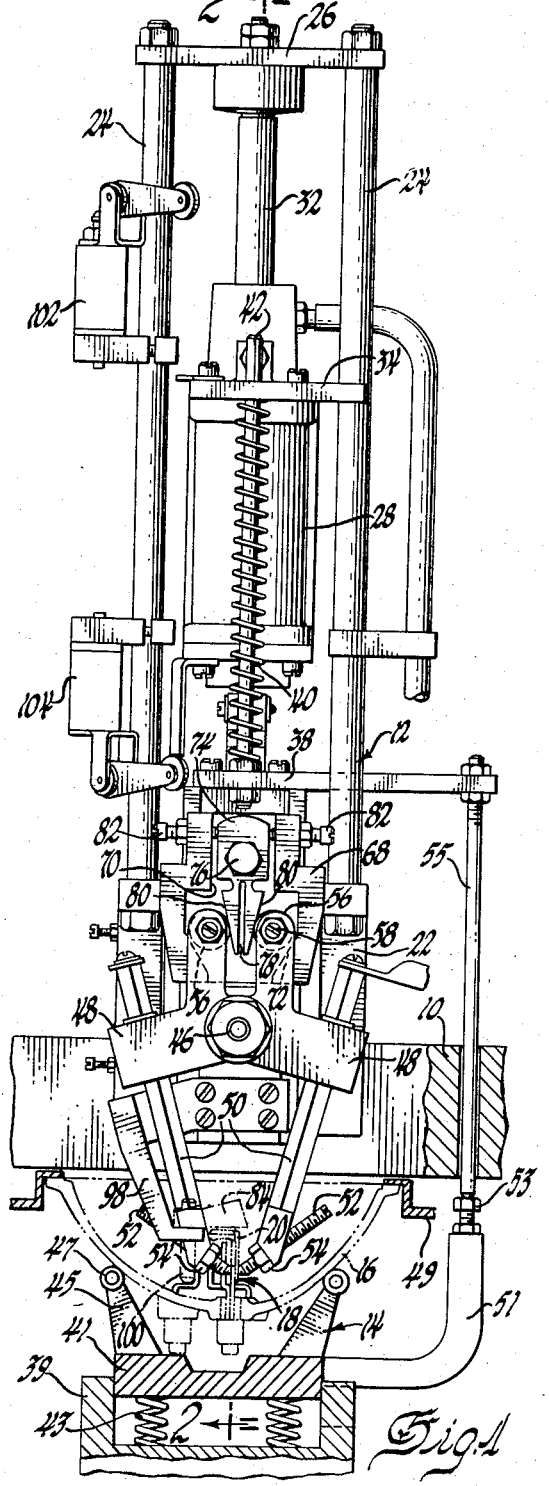
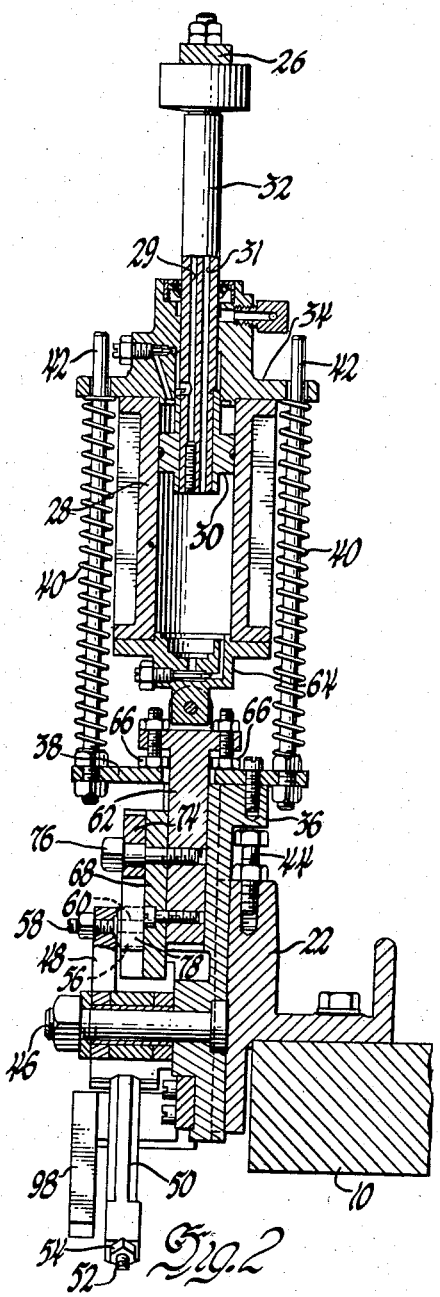
INVENTORS
Henry C. Wiese &
William E. Thompson
BY
E. W. Christen
ATTORNEY.

March 3, 1959 H. C. WIESE ET AL 2,876,331
WELDING APPARATUS
Filed March 29, 1957 2 Sheets-Sheet 2
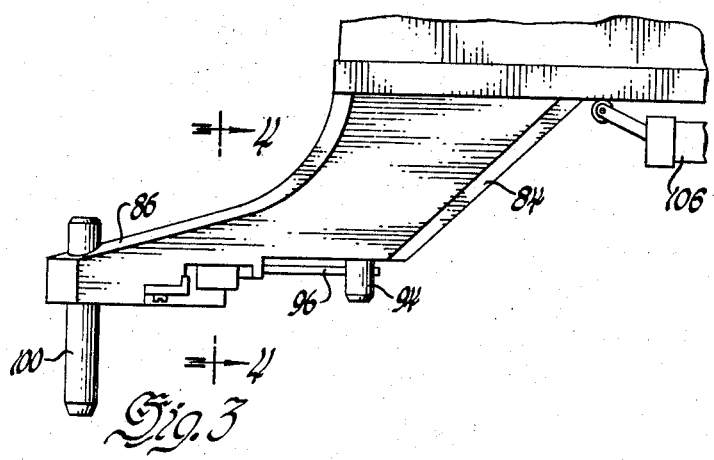
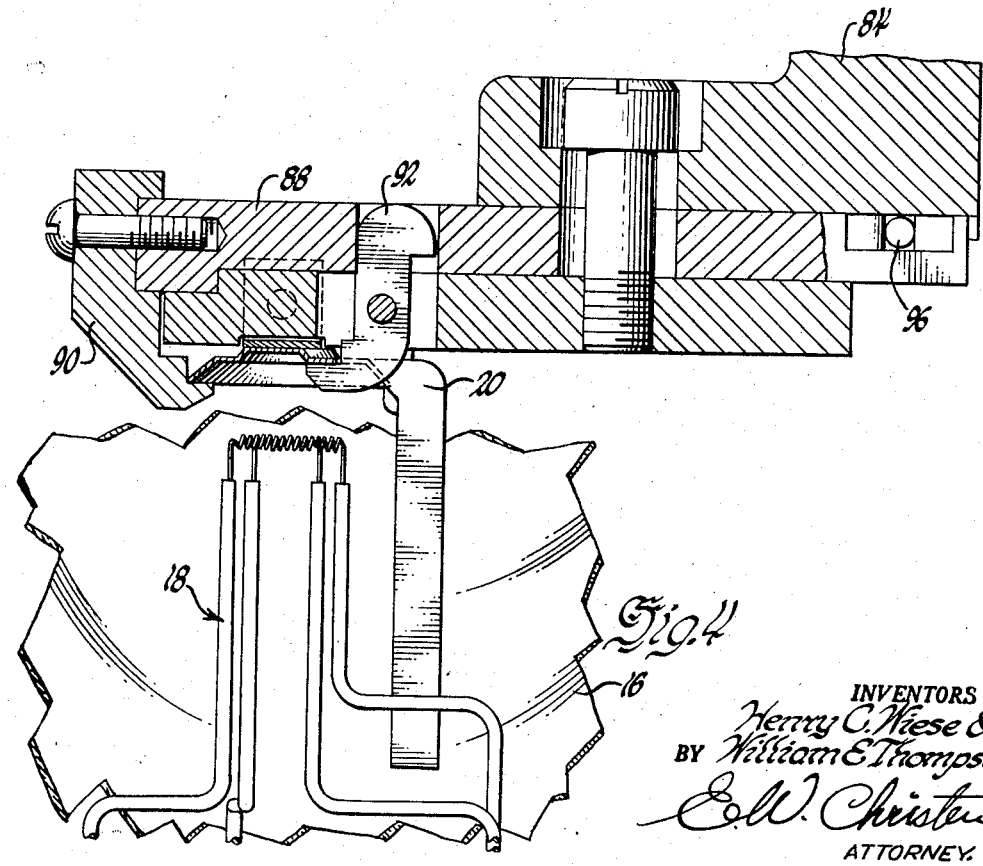
INVENTORS
Henry C. Wiese &
BY William E. Thompson
E.W. Christen
ATTORNEY.

United States Patent Office 2,876,331
Patented Mar. 3, 1959

2,876,331

WELDING APPARATUS

Henry C. Wiese and William E. Thompson, Anderson, Ind., assignors to General Motors Corporation, Detroit, Mich., a corporation of Delaware Application March 29, 1957, Serial No. 649,463

6 Claims. (Cl. 219—78)

This invention relates to resistance welding and more particularly to electrode control apparatus for use in the manufacture of headlamps and the like.

In the present-day vehicle headlamp a component part of the optical system is a filament shield adapted to obstruct selected light rays to reduce the glare light output from the lamp. Accordingly the shield must be accurately positioned relative to the filamentary light source. In accordance with this invention, the shield positioning is accomplished at an operating station of the filament mounting machine in which the reflector body and filaments of the lamp are precisely positioned in relation to each other and to a reference member of the machine. The filament mounting machine is suitably of the type set forth in the U. S. patent to Flaws 2,297,950. By utilizing a shield transfer mechanism which is positionally related to the aforementioned reference member, exact shield location relative to a lamp filament may be attained.

The filament mounting machine of the type mentioned comprises a rotatable turret provided with plural support heads each of which is adapted to support a reflector body and which is sequentially indexed into a succession of fixed operating stations for the filament mounting operations. It is desirable that the shield welding operation be performed at a subsequent fixed operating station at a speed consistent with the high rate of speed of the preceding operations. This is accomplished by automatic and continuous cycling of the shield transfer mechanism and welding apparatus.

Since the welding operation must be performed within the confines of the lamp reflector body, the transfer mechanism and welding electrodes must enter the reflector body through the same limited access space in timed relation. For this purpose the transfer mechanism is adapted for disposition, in the operating position, between the electrode holders. The shield is provided with a depending support arm which is positioned by the transfer mechanism adjacent one lead-in wire of the lamp for attachment thereto by resistance welding. The welding is accomplished by a pair of electrodes which simultaneously squeeze the shield support and lead-in wire and pass a welding current therethrough. This welding must be effected without disturbing the lead-in wire and filament position and therefore the interaction of these parts with the welding electrodes must be carefully coordinated. This is achieved by providing a support for the reflector body which permits floating or yielding of reflector body and lead wires as a unit during the welding action. Additionally, positional control of the electrodes is provided by an adjustable resilient wedge cam which coacts with a pair of bell crank operating levers for the electrode holders and eccentrically mounted follower rollers on the levers permit compensating adjustment. The electrodes are, of course, adjustable in the holders to permit compensation for wear and consumption.

A more complete understanding of the invention may be had from the detailed description which follows taken with the accompanying drawings in which:

Figure 1 is a front elevation view of the inventive welding apparatus.

Figure 2 is a sectional view of the apparatus taken on lines 2—2 of Figure 1.

Figure 3 is a fragmentary view of the transfer mechanism.

Figure 4 is an enlarged fragmentary view taken on lines 4—4 of Figure 3 showing the transfer mechanism in operative relation to a lamp reflector body.

Referring now to the drawings there is shown an illustrative embodiment of the invention in automatic resistance welding apparatus used in the manufacture of sealed beam headlamps. The apparatus comprises, generally, a fixed support table 10 upon which is mounted the welding head 12. Disposed below the level of the fixed support table is support head 14, preferably mounted upon a rotatable turret or conveyer (not shown), adapted to support a headlamp reflector body 16 in known position relative to the table 10. The reflector body is provided with a filament mounting structure including lead-in wires 18 to one of which the filament shield 20 (see Figure 4) is welded. The shield 20 is formed of light gauge sheet metal with an elongated support arm and a shield body which must be accurately positioned relative to the filaments. Preferably the shield 20 is disposed over the lower beam filament and the support arm is welded to the transversely extending portion of one of the lead-in wires of the lower beam filament.

The support head 14 comprises a mounting base 39 which yieldably receives a vertically reciprocable carrier 41 by means of an interposed compression spring 43. The carrier 41 includes plural upstanding support arms 45 having rollers 47 at the upper ends which are appropriately spaced to engage and support the reflector body 16 on its convex surface. The carrier 41 is urged upwardly by the spring 43 to seat the reflector body against the reaction member 49. The carrier 41 is also provided with an operating arm 51 for depressing the carrier to cause displacement of the reflector body from the reaction member 49 permitting limited movement thereof on the rollers 47. The operating arm 51 is provided with an adjustable abutment 53 to permit adjustment of the carrier displacement when actuated by the welding head in a manner to be described presently.

The welding head 12 comprises a mounting bracket 22 secured to the edge of the table 10 in overhanging relation. A pair of spaced vertical rods 24 are secured to the bracket and are connected together at the upper ends by a cross-head 26. A hydraulic actuator including a cylinder 28 and piston 30 is connected by the piston rod 32 to the cross-head 26. The cylinder is thus reciprocable upon the piston under the influence of controlled pressure admitted selectively to the cylinder above and below the piston through passages 29 and 31, respectively. The cylinder includes a laterally extending upper cylinder head 34 which is guided in its vertical motion by the vertical rods 24. A positioning or main slide 36 is disposed upon the mounting bracket 22 and retained by a dovetail connection therewith for vertical reciprocation. The main slide 36 is connected for actuation with the cylinder head 34 through a cross-plate 38 and a pair of coil compression springs 40 which are guided by respective rods 42. The rods 42 are secured to the cross-plate 38 and extend through openings in the cylinder head 34 to permit relative movement of the cylinder head and cross-plate. The main slide 36 is limited in its downward movement by an adjustable stop bolt 44 in the mounting bracket 22. The cross-plate 38 includes a lateral extension which supports at its outer end a push rod 55 in alignment with the abutment 53 on the operating arm 51. Thus, at the lower limit of travel of the crossplate 38 the carrier 41 is displaced downwardly affording freedom of movement to the reflector body 16 as previously mentioned.

A pivot pin or stud 46 is secured to the main slide 36 for movement therewith and supports a pair of bell crank levers 48 each of which is pivotally mounted adjacent its apex on the stud 46. Each bell crank lever 48 supports at one end, near the extremity of the lateral arm, an electrode holder 50 on which is mounted at the lower end a screw-threaded electrode 52. Each electrode extends transversely of the holder at an acute angle and may be adjustably advanced or retracted therein by rotation and locked in position by a lock nut 54. The pair of electrodes 52 extend convergently and terminate at the lower ends in beveled surfaces which are disposed opposite one another for squeezing a workpiece therebetween. The upper end of each electrode holder is provided with an electrical terminal for connection with an electrical power source (not shown) for delivering the welding current. Each bell crank lever 48 supports at the other end, near the extremity of the vertical arm, a cam follower or roller 56. The roller 56 is rotatably supported by a pivot pin 58 in threaded engagement with the lever 48 having offset or eccentric shaft portion 60, which is coaxial with the roller, to permit accurate adjustment of the roller axis. The oppositely disposed pair of rollers 56 may be positioned relative to each other and the actuating mechanism thereof, to be described subsequently, by manipulation of the pivot pins 58 and associated lock nuts.

Actuation of the electrode holders is effected by an operating slide 62 which is vertically reciprocable in the main slide 36 and retained therein by a dovetail or similar sliding connection. The operating slide is connected for actuation to the lower cylinder head 64 of cylinder 28. The lower limit of travel of the operating slide 62 is adjustably established by stop bolts 66 secured thereto in alignment with the cross-plate 38. Upon the operating slide 62 is mounted a cam block 68 adapted to abut crossplate 38 and defining a channel 70, which accommodates the pair of rollers 56, bounded by a pair of oppositely disposed cam surfaces 72 which may be of straight line configuration and convergent at the lower ends. The channel 70 also accommodates a wedge cam 74 which is mounted for pivotal adjustment on the cam block 68 by a bolt 76. The wedge cam is bifurcated by an axial slot 78 to provide a pair of resilient fingers having cam surfaces 80 which are suitably of straight line configuration and convergent at the lower ends. The cam surfaces may be adjustably positioned by manipulation of the pair of set screws 82 which extend through the sides of cam block 68 to effect pivotal motion of the wedge cam.

The positioning and holding of the filament shield 20 during the welding operation is accomplished by a transfer arm 84 of a suitable design shown in Figures 3 and 4. The transfer arm 84 is mounted upon the table 10 and the outer end 86 is movable in an arcuate path over the support head 14 and is vertically reciprocable to lower the outer end into the reflector body 16. Adjacent the outer end of the transfer arm is a shield holding device comprising a slide 88 to which is affixed an outer jaw 90. An inner jaw 92 is pivotally supported on the transfer arm and has its upper end extending into an opening in the slide 88 for actuation thereby. The jaws 90 and 92, shown in the shield holding position in Figure 4, are actuable to the shield release position upon movement of slide 88 outwardly which causes jaw separation. Sliding motion is imparted to the slide 88 by an oscillatory shaft 94 through a rod 96 extending into the slide. It is to be understood that any suitable form of shield holding device, such as a vacuum type holder, may be utilized in the inventive apparatus providing it affords exact positioning and complete release of the shield.

It will be appreciated that precise relative positioning of the filament shield, filaments and lead-in wires, and welding electrodes is accomplished by positioning the reflector body, transfer arm, and welding head relative to the table 10 which is a common reference member. If desired, the outer end of the transfer arm may be positionally referenced to the welding head adjacent the electrodes. For this purpose, a seating member 98 is rigidly mounted on the lower end of the main slide 36 and is provided with an alignment opening adjacent the free end. The transfer arm at its outer end includes an alignment pin 100 which is adapted to register with the alignment opening to ensure correct relative positioning. It will be noted that entry of the pin 100 into the corresponding opening is effected by swinging of the transfer arm into position between the welding electrodes and then lowering the transfer arm relative thereto.

Automatic sequence control of the apparatus is provided, in part, by a limit switch 102 mounted on the rod 24 and adapted when actuated by cylinder 28 to terminate fluid pressure supply to passage 29. Similarly, limit switch 104 is effective when actuated by cylinder 28 to terminate fluid pressure supply to passage 31 when downward motion of main slide 36 is arrested by stop bolt 44. Additional downward movement of cylinder 28, and hence operating slide 62, is caused by actuation of a limit switch 106 which is effective to admit additional pressure to passage 31.

In operation of the inventive apparatus a cycle is initiated, with the support head 14 and reflector body 16 in the position shown, by admitting fluid pressure to the cylinder 28 below the piston 30 through the passage 31. In this initial portion of the cycle the operating slide 62 is in its upper position relative to main slide 36 with cam block 68 engaging cross-plate 38 and thus the wedge cam 74 is withdrawn from the rollers 56 which rest against cam surface 72. Thus the electrodes 52 are separated sufficiently to provide adequate clearance of the lead-in wires. The admission of fluid pressure below the piston causes the cylinder to descend until limit switch 104 is actuated and motion is arrested by engagement of the main slide 36 with stop bolt 44. During this first stage of cylinder descent the force of the cylinder is transmitted to the main slide through the coil springs 40 without substantial compression thereof and thus the operating slide 62 is maintained in the upper position relative to the main slide. Accordingly, the tips of electrodes 52 are separated and, at the end of this first stage of cylinder descent, are disposed on opposite sides of the lead-in wire to which the shield is to be welded. Also the push rod 55 is engaged with the operating arm 51 and the carrier 41 is depressed thereby to permit limited movement of the reflector body 16.

The transfer arm 84 is swung into position above the reflector body 16 with the holding jaws and the shield disposed between the electrode holders 50. When this position is attained the transfer arm is lowered with alignment pin 100 in registration with the opening in the seating member 98 to cause the arm to seat accurately thereagainst. This ensures correct positioning of the shield 20 with the support arm thereof disposed against the lead-in wire. The lowering movement of the transfer arm 84 causes actuation of limit switch 106 which results in admission of additional pressure to cylinder 28 beneath the piston. Thus the cylinder descends further in a second stage of movement causing compression of springs 40 and displacement of operating slide 62 until stop bolts 66 engage cross-plate 38. In this second stage of movement the wedge cam 74 and cam block 68 are moved downwardly relative to the main slide 36. Consequently cam surfaces 80 cause opposite rotation of bell crank levers 48 to displace the tips of electrodes 52 toward each other. This movement squeezes the lead-in wire and shield support arm between the electrodes in readiness for the application of welding current. There is no disturbance of the position of the lead wires and filament relative to the reflector body because the latter may partake of rocking or self-aligning movement by virtue of its spacing from the reaction member 49. The squeezing force is properly set by adjustment of the travel of the electrode tips which is established by manipulation of the set screws 82 to vary the angularity of wedge cam 74 and compensating the resulting movement by adjustment of the eccentric shafts 60 to position the rollers 56. Electrode tip wear is compensated by advancing the screw-threaded electrodes appropriately.

The welding current is supplied through suitable control and timer means, not shown, during the squeezing action of the electrodes. Upon termination of the welding current flow the jaws 90 and 92 of the transfer arm 84 are actuated to release the shield 20 and the transfer arm is withdrawn by upward movement followed by swinging the outer end thereof from between the electrode holders. Following, or simultaneously with, the displacement of the transfer arm, fluid pressure is admitted to the cylinder 28 above the piston to elevate the cylinder. During the initial movement of the cylinder the operating slide 62 is raised and the cam surfaces 72 on cam block 68 engage the rollers 56 and cause separation of the tips of electrodes 52. During this separating movement of the electrodes the main slide 36 is held stationary by springs 40. When the separation is sufficient for the electrodes to clear the lead-in wires and shield, the continued elevation of the cylinder lifts the main slide 36, by engagement of cam blocks 68 with cross-plate 38, until the limit switch 102 is actuated. With this motion, the push rod 55 is raised and the carrier 41 is returned upwardly by the spring 43 to seat the reflector body 16 firmly against the reaction member 49. The welding head is thus returned to its initial position clear of the reflector body 16 and is in readiness for a succeeding cycle.

Although the description of this invention has been given with respect to a particular embodiment, it is not to be construed in a limiting sense. Many variations and modifications within the spirit and scope of the invention will now occur to those skilled in the art. For a definition of the invention reference is made to the appended claims.

We claim:

1. Automatic resistance welding apparatus comprising a fixed welding station, a welding head at said station including a pair of electrode holders pivotally mounted on a movable slide, a pair of welding electrodes disposed in the respective holders in opposed relation, yieldable receiving means at said station for supporting a headlamp reflector including a lead wire in alignment with said welding head, an actuator connected with said head for displacement of said slide toward the receiving means with said electrodes astride the lead wire, transfer means adapted to hold a workpiece in depending relation and being positionable between said electrode holders and above said electrodes, operating means for pivoting said electrode holders to cause said electrodes to squeeze the lead wire and the workpiece therebetween, and control means for said operating means associated with and actuated in response to positioning of said transfer means.

2. Automatic resistance welding apparatus comprising a fixed welding station, a welding head at said station including a movable slide, a pair of bell crank levers pivotally mounted on said movable slide and supporting a respective pair of electrode holders, a pair of welding electrodes disposed in the respective holders in opposed relation, cam means movably mounted on said slide for actuation of said levers, yieldable receiver means at said station for supporting a headlamp reflector body including a lead wire in alignment with said welding head, an actuator, a yieldable drive interconnecting the actuator with said slide for displacement of said slide toward the receiving means, control means for energizing the actuator and stop means for arresting said slide with said electrodes disposed astride the lead wire, transfer means adapted to hold a second workpiece in depending relation and being positionable between said electrode holders and above said electrodes, said cam means being connected with said actuator, and control means for energizing said actuator in response to positioning of said transfer means to cause the cam means to pivot the holders and squeeze the workpieces between said electrodes.

3. Automatic resistance welding apparatus comprising a fixed welding station, a welding head at said station including a pair of electrode holders pivotally mounted on a movable slide, a pair of welding electrodes disposed in respective holders in opposed relation, a support member adapted to receive a headlamp reflector body including a lead wire in alignment with said welding head, said support member comprising a yieldable receiver and a reaction member for accommodating a reflector body therebetween, an actuator connected with said head for displacement of said slide toward the support member with said electrodes astride the lead wire, means for supporting a workpiece adjacent said lead wire between said electrodes, and operating means for pivoting said electrode holders to cause said electrodes to squeeze said lead wire and workpiece therebetween.

4. Apparatus for the manufacture of vehicle headlamps comprising a fixed operating station, an operating tool at said station displaceably mounted on a movable slide, a support member adapted to receive a headlamp reflector including a lead wire in alignment with said operating tool, said support member comprising a yieldable receiver and a reaction member for accommodating a reflector body therebetween, an actuator connected with said movable slide for displacement thereof toward the support member with said operating tool adjacent the lead wire, means for supporting a workpiece adjacent said lead wire and said tool, means interposed between said actuator and said yieldable receiver for displacement of the latter upon movement of said slide toward the support member whereby the reflector body is permitted limited movement between the receiver and reaction member, and operating means for displacing said tool relative to said slide into engagement with said lead wire and workpiece.

5. Automatic resistance welding apparatus comprising a fixed welding station, a welding head at said station including a pair of electrode holders pivotally mounted on a movable slide, a pair of welding electrodes disposed in respective holders in opposed relation, a support member adapted to receive a headlamp reflector body including a lead wire in alignment with said welding head, said support member comprising a yieldable receiver and a reaction member for accommodating a reflector body therebetween, an actuator connected with said head and slide for displacement of said slide toward the support member with said electrodes astride the lead wire, means interposed between said actuator and said yieldable receiver to cause limited displacement of the latter upon displacement of said slide toward the support member whereby said reflector body is capable of limited movement between the receiver and reaction member, means for supporting a workpiece adjacent said lead wire between said electrodes, and operating means for pivoting said electrode holders to cause said electrode holders to squeeze said lead wire and workpiece therebetween.

6. Automatic resistance welding apparatus comprising a fixed welding station, a welding head at said station including a pair of electrode holders pivotally mounted on a movable slide, a pair of welding electrodes disposed in respective holders in opposed relation, support means adapted to receive a headlamp reflector body including a lead wire in alignment with said welding head, said support member comprising a yieldable receiver and a reaction member for accommodating a reflector body therebetween, an actuator connected with said head for displacement of said slide toward the support member with said electrodes astride the lead wire, means interposed between the actuator and the yieldable receiver for causing displacement of the latter upon displacement of said slide toward the receiver whereby the reflector body is capable of limited rocking movement therebetween, transfer means adapted to hold a workpiece between said electrode holders and adjacent said lead wire, operating means for pivoting said electrode holders to cause said electrodes to squeeze the lead wire and workpiece therebetween, and control means for said operating means associated with and actuated in response to positioning of said transfer mechanism.

References Cited in the file of this patent

UNITED STATES PATENTS

| | | |
|---|---|---|
| 1,818,665 | Baker | Aug. 11, 1931 |
| 2,298,937 | Green | Oct. 13, 1942 |
| 2,677,035 | Brent et al. | Apr. 27, 1954 |